United States Patent [19]

Steber et al.

[11] Patent Number: 5,593,134

[45] Date of Patent: Jan. 14, 1997

[54] MAGNETICALLY ASSISTED PIEZO-ELECTRIC VALVE ACTUATOR

[75] Inventors: George R. Steber, Mequon; Dale A. Knutson, Nashotah, both of Wis.

[73] Assignee: Applied Power Inc., Butler, Wis.

[21] Appl. No.: 391,887

[22] Filed: Feb. 21, 1995

[51] Int. Cl.$^6$ ..................................................... F16K 31/02
[52] U.S. Cl. ..................................... 251/129.17; 251/331
[58] Field of Search ........................... 251/129.01, 129.15, 251/129.17, 331; 335/18

[56] References Cited

U.S. PATENT DOCUMENTS

| | | | |
|---|---|---|---|
| 2,596,409 | 5/1952 | Johnson et al. | 251/129.17 X |
| 2,928,409 | 3/1960 | Johnson et al. | 137/82 |
| 3,063,422 | 11/1962 | Gregowski et al. | 137/82 X |
| 3,096,269 | 7/1963 | Halbach et al. | 251/129.01 X |
| 3,152,612 | 10/1964 | Avery | 137/625.62 X |
| 3,465,732 | 9/1969 | Kattchee | 123/32 |
| 3,524,474 | 8/1970 | McCormick | 251/129.06 |
| 3,676,722 | 7/1972 | Schafft | 310/8.6 |
| 3,753,426 | 8/1973 | Lilley | 123/139 E |
| 3,803,424 | 9/1974 | Smiley et al. | 307/149 |
| 3,927,652 | 12/1975 | O'Neill | 123/139 AT |
| 4,098,560 | 7/1978 | O'Neill | 417/214 |
| 4,195,811 | 4/1980 | Corrado et al. | 251/30 |
| 4,219,755 | 8/1980 | O'Neill et al. | 310/348 |
| 4,227,111 | 10/1980 | Cross et al. | 310/358 |
| 4,271,989 | 6/1981 | O'Neill et al. | 222/282 |
| 4,298,181 | 11/1981 | Corrado et al. | 251/129.06 |
| 4,318,023 | 3/1982 | O'Neill et al. | 310/328 |
| 4,324,268 | 4/1982 | Jacobson | 137/312 |
| 4,412,148 | 10/1983 | Klicker et al. | 310/358 |
| 4,460,840 | 7/1984 | Weiger et al. | 310/328 |
| 4,466,390 | 8/1984 | Babitzka et al. | 123/90.16 |
| 4,492,360 | 1/1985 | Lee, II et al. | 251/129 |
| 4,535,810 | 8/1985 | Duder | 251/129.06 X |
| 4,550,744 | 11/1985 | Igashira et al. | 137/80 |
| 4,610,426 | 9/1986 | Brandner | 251/129.06 |
| 4,624,796 | 11/1986 | Giniewicz | 252/62.9 |

(List continued on next page.)

FOREIGN PATENT DOCUMENTS

| | | |
|---|---|---|
| 0117195 | 8/1984 | European Pat. Off. . |
| 28079 | 2/1983 | Japan .............................. 251/129.17 |
| 2171498 | 8/1986 | United Kingdom . |
| 2264998 | 9/1993 | United Kingdom .............. 251/129.15 |
| 2280999 | 2/1995 | United Kingdom .............. 251/129.15 |
| WO86/07429 | 12/1986 | WIPO . |
| WO94/00696 | 1/1994 | WIPO . |

OTHER PUBLICATIONS

Applicant'Exhibit 1, 1 page flyer of Edo Western Corp., Salt Lake City, Utah, entitled "Piezo–Ceramic Monomorph" and identified at the bottom by EWC 01985 7512, admitted prior art (No Date).

Applicant's Exhibit 2, brochure entitled "EDO Corporation Acoustics Division Ceramic Operations Piezoelectric Ceramics, Material Specifications Typical Applications" of EDO Corporation Acoustics Division Ceramic Operations, Salt Lake City, Utah, admitted prior art (No Date).

Primary Examiner—Hoang Nguyen
Attorney, Agent, or Firm—Quarles & Brady

[57] ABSTRACT

A piezo-electrically actuated fluid control valve has a nozzle type seat, a magnet opposite from the seat, and a piezoelectric actuator in sheet form between the seat and magnet. The actuator includes a piezo-ceramic layer laminated to an electrode sheet, so that the composite is parallel to the seat and a surface of the magnet. The electrode sheet has opposite edges which extend beyond the piezo-ceramic layer and are clamped by the housing of the valve so that the center of the actuator is positioned between the seat and magnet. When an electric field is applied to the piezo-ceramic layer, the actuator bows or dishes so as to displace from the seat toward the magnet, and the magnetic field of the magnet draws the actuator further away from the seat, to increase the valve opening between the actuator and the seat. The actuator may be operated by a pulse width modulated or a proportional analog electrical signal, which may be applied in combination with the magnetic field to move the actuator, or if the magnetic field is induced by an electromagnet, electrical and magnetic control modes may be used alternatively.

16 Claims, 2 Drawing Sheets

U.S. PATENT DOCUMENTS

| | | | |
|---|---|---|---|
| 4,629,926 | 12/1986 | Siegal | 310/331 |
| 4,643,155 | 2/1987 | O'Neill | 123/506 |
| 4,688,536 | 8/1987 | Mitsuyasu et al. | 123/490 |
| 4,690,465 | 9/1987 | Takeda et al. | 303/119 |
| 4,700,971 | 10/1987 | Doi et al. | 280/707 |
| 4,705,059 | 11/1987 | Lecerf et al. | 251/129.06 X |
| 4,724,801 | 2/1988 | O'Neill | 123/90.12 |
| 4,774,976 | 10/1988 | Janecke et al. | 137/14 |
| 4,793,313 | 12/1988 | Paganon et al. | 123/506 |
| 4,862,029 | 8/1989 | Kasai et al. | 310/311 |
| 4,877,296 | 10/1989 | Leiber et al. | 303/115 |
| 4,892,328 | 1/1990 | Kurtzman et al. | 280/707 |
| 4,912,343 | 3/1990 | Stuart | 310/14 |
| 4,969,662 | 11/1990 | Stuart | 280/707 |
| 4,999,819 | 3/1991 | Newnham et al. | 367/157 |
| 5,021,957 | 6/1991 | Yoshino et al. | 364/426.01 |
| 5,099,158 | 3/1992 | Stuart et al. | 310/14 |
| 5,100,100 | 3/1992 | Benson et al. | 251/129.06 |
| 5,135,070 | 8/1992 | Schwitalla | 180/142 |
| 5,159,225 | 10/1992 | Um | 310/328 |
| 5,162,767 | 11/1992 | Lee et al. | 335/255 |
| 5,173,673 | 12/1992 | Weigand et al. | 335/18 |
| 5,175,465 | 12/1992 | Um et al. | 310/328 |
| 5,187,398 | 2/1993 | Stuart et al. | 310/14 |
| 5,191,687 | 3/1993 | Dam et al. | 29/25.35 |
| 5,203,537 | 4/1993 | Jacobs et al. | 251/129.06 |
| 5,207,737 | 5/1993 | Hanley et al. | 137/85 |
| 5,222,714 | 6/1993 | Morinigo et al. | 251/129.16 |
| 5,224,510 | 7/1993 | Pericles | 137/487.5 |
| 5,237,968 | 8/1993 | Miller et al. | 123/90.11 |
| 5,267,589 | 12/1993 | Watanabe | 137/625.65 |
| 5,276,657 | 1/1994 | Newnham et al. | 367/157 |
| 5,285,995 | 2/1994 | Gonzalez et al. | 248/550 |
| 5,328,147 | 7/1994 | Stobbs | 251/30.02 |
| 5,340,081 | 8/1994 | Wright | 251/129.06 |
| 5,374,029 | 12/1994 | Bailey | 251/129.17 X |
| 5,452,878 | 9/1995 | Gravesen et al. | 251/331 X |
| 5,470,095 | 11/1995 | Kazama et al. | 251/129.17 X |

MAGNETICALLY ASSISTED PIEZO-ELECTRIC VALVE ACTUATOR

BACKGROUND OF THE INVENTION

1. Field of the Invention

This invention relates to piezo-electrically actuated hydraulic or pneumatic valves.

2. Discussion of the Prior Art

Piezo-electric actuators for hydraulic and pneumatic valves are known. In prior designs, a stack of piezo-electric actuators was put together in order to obtain sufficient displacement at acceptable voltage levels. In another prior art design, a piezoelectric strip was cantilevered at one end and caused to bend so that the displacement at the other end would be sufficient to actuate a fluid control valve.

In other configurations, disclosed in U.S. patent application Ser. No. 08/392,016 entitled "Piezo Composite Sheet Actuated Valve" and in U.S. patent application Ser. No. 08/391,972 entitled "Piezo-Electrically Actuated Valve," filed on the same day as this application and commonly assigned to Applied Power, Inc., piezo-electrically actuated valves are disclosed in which the piezo-electric actuator is in sheet form and constrained by the housing at opposite edges, with the valve orifice or seat adjacent to the center of the actuator. When the actuator is electrically excited, it bows or cups so as to displace the center portion and vary the flow area between the actuator and the seat.

A problem with using a piezo-electric element as a hydraulic or pneumatic valve actuator is that typically the displacement obtainable is quite limited. Forces obtainable are also quite limited.

SUMMARY OF THE INVENTION

The present invention is aimed at increasing the displacements and actuation forces obtainable with piezo-electric hydraulic or pneumatic valve actuators. Thus, the invention provides a valve of the type having a piezo-electric actuator for varying a flow area past a valve seat in which the valve includes a magnet opposite from the seat with the actuator between the magnet and the seat. The actuator is magnetically attracted by the magnet when the actuator deflects away from the seat. Thereby, the displacement of the actuator from the seat, and therefore the flow area, is increased, and the opening force of the actuator is also increased.

In a preferred aspect, the magnet is an electromagnet. The electromagnet can be selectively energized to either act by itself to attract the actuator, or to act in concert with the energization of the actuator to move the actuator away from and toward the valve seat.

DETAILED DESCRIPTION OF THE PREFERRED EMBODIMENTS

Figure 1:
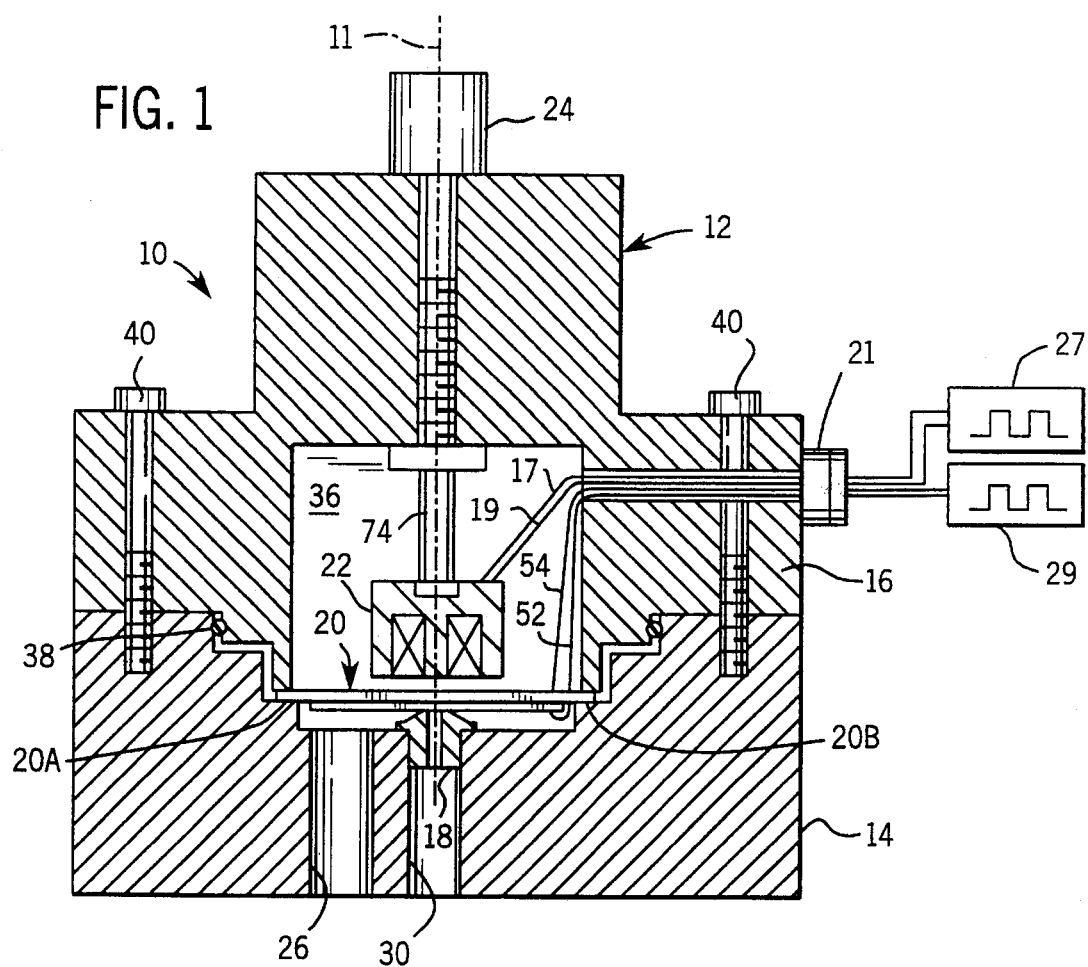
FIG. 1 is a schematic cross-sectional view of a piezo-electrically actuated valve incorporating the invention.

Referring to FIG. 1, a piezo-electrically actuated valve 10 of the invention includes a valve housing 12 which is made up of body 14 and cap 16 which define chamber 36. The valve 10 also includes nozzle type valve seat 18, piezo-electric actuator 20, solenoid magnet 22 and, optionally, an adjusting means 24. The adjusting means 24, which may be threaded in the housing 12 and rotatable relative to the magnet 22, is provided to adjust the axial spacing of the magnet 22 relative to the actuator 20 along axis 11.

The body 14 defines an inlet passage 26 and an outlet passage 30, with the seat 18 between the two passages. The inlet passage 26 is for receiving a pressurized flow of fluid, such as air or hydraulic fluid, from a suitable source (not shown) such as a pump, and communicating it to the chamber 36 in which the actuator 20 resides.

The ends 20A and 20B of the actuator 20 are clamped between the cap 16 and the body 14. An O-ring 38 seals the cap 16 to the body 14 and bolts 40 secure the cap 16 to the body 14. Electrical connector 21 is secured to the cap 16 so as to provide a fluid tight connection therebetween. Wires 17 and 19 run from connector 21 to electro-magnet 22 and wires 52 and 54 run from connector 21 to the piezo-electric actuator 20. Connector 21 has terminals which are electrically connected to the respective wires 17, 19, 52 and 54, to establish an electrical connection between the magnet 22 and actuator 20, and suitable respective power sources 27, 29 outside of the valve 10. Such power sources are well known and commercially available, for example, from Applied Power Inc., of Butler, Wis. Such power sources may be selected to output either a pulse width modulated signal or a proportional analog voltage signal in any combination, and both sources may be operated at the same time, or not.

It should be understood that the illustration of FIG. 1 is a schematic representation of a basic valve arrangement incorporating the invention and that the invention could be applied to any of a variety of valves, including those described in U.S. Pat. Nos. 5,328,147 and 4,774,976, which are hereby incorporated by reference, and to any of a variety of piezoelectric actuators including those described in U.S. patent application Ser. No. 08/391,972, entitled "Piezo-Electrically Actuated Valve" and U.S. patent application Ser. No. 08/392,016, entitled "Piezo Composite Sheet Actuated Valve", both referred to above, filed on the same day as this application and commonly assigned to Applied Power Inc., the disclosures of which are also hereby incorporated by reference.

Figure 2:
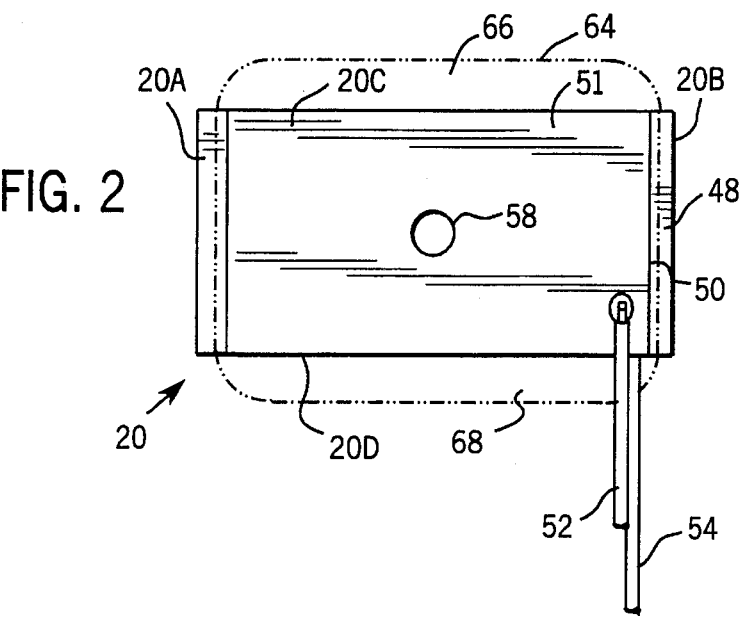
FIG. 2 is a bottom plan view of a piezo-electric actuator for the valve of FIG. 1.

The actuator 20 is a piezo-ceramic monomorph, which as illustrated includes an electrode sheet 48 which is laminated on one of its sides to a layer 50, which is a sheet of piezo-ceramic material. An electrically conductive coating 51, such as silver oxide, is applied to the surface of sheet 50 which is opposite from electrode 48 and a lead wire 52 (FIGS. 2 and 3) is soldered so as to establish electrical contact with the conductive coating electrode 51. A second lead wire 54 is soldered to the surface of electrode 48 which is opposite from piezo-ceramic sheet 50 so as to establish electrical contact with the electrode sheet 48. An electrical potential is applied between the wires 52 and 54 so as to excite the piezo-ceramic sheet 50, which would be in the field created between the coated electrode 51 and the sheet electrode 48.

Figure 3:
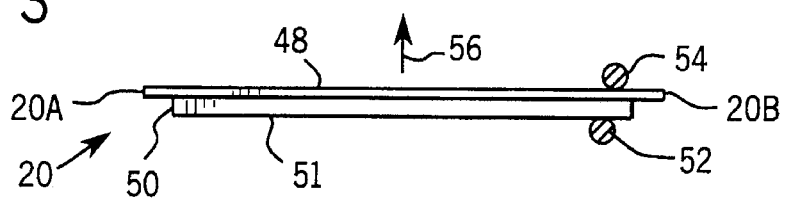
FIG. 3 is a side plan view of the piezo-electric actuator of FIG. 2.

The piezo-ceramic sheet 50 is poled, preferably in the thickness direction, so that when it is excited with an electric field, the actuator 20 bows or cups in the direction indicated by arrow 56 in FIG. 3. Such monomorphs are available from EDO Corporation, Acoustics Division, of Salt Lake City, Utah. In one embodiment which has been tested with satisfactory results, the electrode sheet 48 was made of invar metal, and had dimensions of 2" by 1" by approximately 0.008" thick. The piezo-ceramic sheet was EDO Corporation's EC-98 ceramic, which is a lead magnesium niobate composition, and had dimensions of 1.75" by 1" by 0.020" thick. Since the actuator 20 is assembled in the housing 12 with the piezo-ceramic sheet side facing the nozzle 18, a small area (for example 0.19" diameter) 58 of the coated electrode 51 is removed at the center of the actuator 20 and the nozzle 18 contacts the actuator 20 within this area. At least the electrode coating 51 must be removed in the area 58 or else, since the electrode 51 is positively charged when the actuator 20 is excited, an electrical short would be created between the electrode coating 51 and the nozzle 18. Alternatively, since the electrode sheet 48 is grounded, as is the nozzle 18, the electrode coating 51 and the piezo-ceramic sheet 50 may be removed in the area 58 and the electrode sheet 48 allowed to contact and seal against the nozzle 18.

The actuator 20 is clamped by the housing 12 along only its end edges 20A and 20B, which are the end edges of the electrode sheet 48. The dotted line 64 in FIG. 2 identifies the shape defined by the sidewalls of the chamber 36 relative to the actuator 20 and there it can be seen that a space 66 and 68 exists between the respective side edges 20C and 20D of the actuator 20 and the sidewalls 20 of the chamber 36. The spaces 66 and 68 allow fluid entering the chamber 36 from the inlet passage 26 to flow around the side edges 20C and 20D of the actuator 20 to the far side (or electrode sheet 48 side) of the actuator 20.

Since the pressure inside of the chamber 36 exterior of the nozzle 18 is the same everywhere within the chamber 36 (when the nozzle 18 is closed, i.e., under no flow conditions), and is higher than the pressure inside of the nozzle 18, there is a net fluid force on the actuator 20 which biases it toward the nozzle 18. This force can be estimated from the following equation:

$$F = A_1(P_1 - P_2)$$

where F is the force, $A_1$ is the cross-sectional area of the nozzle 18, $P_1$ is the pressure in the chamber 36 and $P_2$ is the pressure interior of the nozzle 18.

Although the actuator 20 is quite brittle due to the brittleness of the piezo-ceramic sheet 50, it does have some resilient flexibility contributed by the electrode sheet 48 and its mounting in the housing 12. The adjusting means 24 has a shaft 74 which is axially secured to the magnet 22 so as to be rotatable relative thereto and the adjusting means is sealed to the body 14 so as to create a fluid tight connection. In conventional fashion, the adjusting means 24 can be screwed into or out of the housing 12 so as to make small adjustments in the axial position of the shaft 74, and when that is done, very small adjustments in the axial position of the magnet 22 are also made relative to the actuator 20. Thus, the magnet 22 is adjusted toward or away from the actuator 20 by the adjusting means 24. It is noted that in production of a valve of the invention, the adjusting means need not be provided as part of the valve, but some other means such as shims, a friction fit, or the type of adjustment described in U.S. Pat. No. 4,774,976 may be provided so that the axial position of the magnet 22 relative to the actuator 20 could be adjusted if necessary so as to provide the desired results in relation to the actuator 20. Alternatively, no adjustment may be necessary, depending on manufacturing tolerances and the application to which the valve is to be applied.

In the preferred embodiment, the axial position of the actuator 20 relative to the seat 18 is such as to produce a null condition (i.e., no flow) at relatively low pressure, for example, 20 psig, in the chamber 36. However, in normal operation, the pressure in chamber 36 may be much higher, for example 200 psig.

The actuator 20 may be excited by a pulse width modulated electrical signal or by a proportional voltage signal. The voltages required are relatively high. In the actuator described, at a voltage of 500 volts the center displacement (at axis 11 of nozzle 18) is approximately 0.010 inches. Although high voltages are required, the actuator 20 draws current only while it is in motion (typically less than 0.001 sec.) and thus requires less average current than a solenoid for the same duty cycle. The actuator 20 has a fast response so that a relatively high frequency can be used for a pulse width modulated signal for driving the actuator 20. Using a relatively high frequency for modulating the actuator 20 (relative to the frequency which can be used with a solenoid operated valve) is desirable because it results in smoothing of the resulting pressure signal at the control passage 30, i.e. the resulting pressure signal has less "dither" at the higher frequencies. Also, for a given pulse width modulated signal frequency, the pressure control band increases with faster valve actuation.

To increase the displacement achievable with the actuator 20, or conversely reduce the required voltage for a given displacement of the actuator 20, magnet 22 is provided. Magnet 22 is shown in FIG. 1 as an electromagnet, but could be replaced with a permanent magnet. The magnetic field of an electromagnet can be adjusted by varying the electrical signal applied to the electromagnet by the source 27, thereby allowing an additional means of control of the actuator 20. For this to work, the actuator 20 must be magnetically attractable. In the embodiment illustrated and described, this is provided by the electrode sheet 48, since the invar material of the sheet 48 is magnetically attractable. A magnetically attractable piece, such as a sheet of iron, steel or a magnet, could also be attached to the actuator 20, for example to the electrode sheet 48, to provide an additional magnetic flux path.

The magnet 22 when energized creates a magnetic field, which is variable according to the electrical signal applied to the magnet coil by source 27. The magnetic field attracts the actuator 20 toward the magnet 22, particularly when the actuator 20 gets close to the magnet 22. Thus, with the magnet 22, an actuator 20 can be spaced apart from the magnet 22 such that at some point as actuator 20 approaches its peak displacement from the seat 18, the magnetic field generated by magnet 22 acts together with the piezo-electric force to draw the center of the actuator 20 further away from the seat 18.

Figure 5:
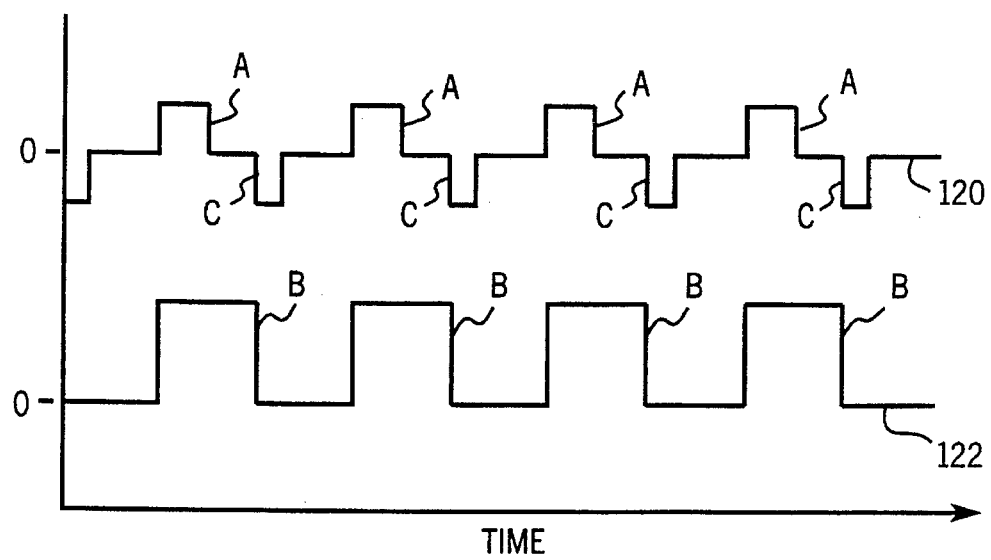
FIG. 5 is a graphical depiction of a timing sequence comparing the timing of an actuation signal applied to an electro-magnet for the invention with the timing of an actuation signal applied to a piezo-electric actuator for the invention.

This may be accomplished, for example, by energizing the magnet 22 and the actuator 20 in concert, which may be done in many different ways. For example, a single power source could be used for both the actuator 20 and the magnet 22, with the actuator 20 and magnet 22 connected in series or in parallel. alternatively, if two separate power sources are used, as illustrated in FIG. 1, then the pulse width modulated signals of the two sources could be set to have the same phase and duty cycle, or the phase relationship between the two signals and their duty cycles may be varied in any way desired to vary the results achieved. For example, referring to FIG. 5 which compares a possible timing sequence of the magnet actuating signal 120 with the actuator actuating signal 122, it may be possible to allow the magnet signal to go low, identified at A in each cycle, after the magnet 22 makes contact with the actuator 20 and residual magnetism between the magnet 22 and actuator 20 may be sufficient to hold the actuator 20 against the magnet 22 until the actuator signal (from source 29) goes low, identified at B in each cycle. When that occurs, it may be desirable to reverse the polarity of the signal applied to the magnet 22 (identified at C) for a short duration, which would run the magnetic flux due to residual magnetism down to zero, to assist moving the actuator 20 toward the seat 18. Alternatively, the magnet 22 may be operated separately and apart from electrically actuating the actuator 20 to draw the actuator 20 away from the seat 18 by itself. Another alternative is that the actuator 20 can be moved away from the seat 18 by only the electrical actuation provided by source 29, without assistance from the magnet 22.

Figure 4:
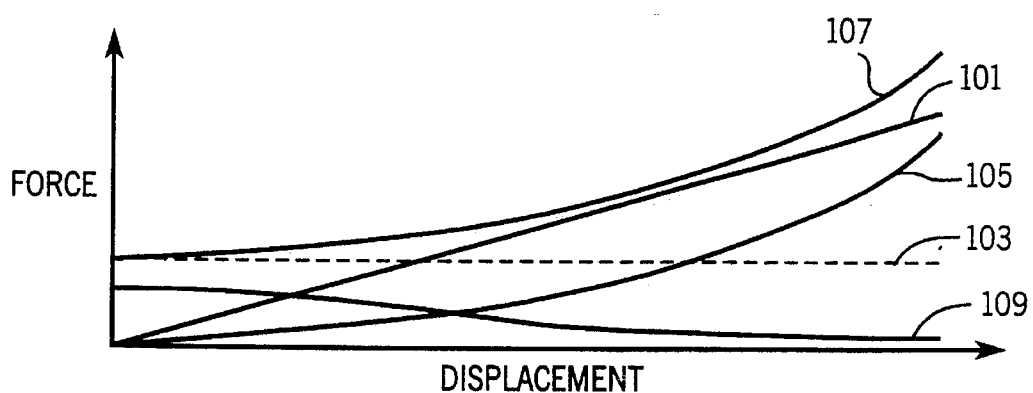
FIG. 4 is a graphical depiction of the major non-fluid forces acting on an actuator of the valve as a function of displacement from the valve seat.

FIG. 4 illustrates a graphical depiction of the major forces acting on the actuator 20 as a function of the center displacement of the actuator 20 from the seat 18 when the actuator is both magnetically and electrically actuated (i.e., when both sources 27 and 29 are operated in unison to move the actuator 20). Not counting the inertia force, there are three major non-fluid forces: the spring force due to the resiliency of the actuator 20, which tends to close the actuator 20 against seat 18; the piezo force, which is the force induced by subjecting layer 50 of actuator 20 to an electric field via leads 52 and 54, which tends to open the seat 18; and the magnet force introduced by magnet 22, which also tends to open the seat. In FIG. 4, the spring force is depicted as a line 101 of constant slope, the piezo force is depicted as a constant force by line 103, and the magnet force is depicted by curve 105, the slope of which increases with increasing displacement, i.e., as the actuator 20 approaches the magnet 22. Curve 107 represents the sum of the piezo force and the magnet force, both of which act in the same direction, tending to displace the actuator 20 away from the nozzle 18. The force due to fluid pressure acting on the actuator 20, which tends to close the actuator 20 against the nozzle 18, is depicted by line 109.

As described above, the axial position of the magnet 22 relative to the actuator 20 and also the strength of the magnetic field produced by the magnet 22 are adjustable. As such, the spacing and magnetic field strength may be adjusted so that when the magnet 22 is energized and the actuator 20 is energized, the actuator 20 latches up against the bottom surface of the magnet 22. This method does not use the inertia force generated when the actuator 20 moves toward the magnet 22 from the seat 20. However, the inertia force, which is in the same direction as the piezo force and the magnet force, gives an added measure of protection that the actuator 20 will latch against the magnet 22. It should be noted that in this method, the spacing between the magnet 22 and the actuator 20 and the magnetic field strength must be adjusted to not only insure latching, but should also be adjusted to insure that when the actuator 20 is de-energized, the spring force is greater than the magnet force so that actuator 20 will unlatch from the magnet 22, so that the valve will close.

The spacing of the magnet 22 from the actuator 20 and the magnetic field strength can also be adjusted (or designed in a production unit) so as to more fully utilize the inertia force generated when the actuator 20 moves in the direction from the seat 18 toward the magnet 22. In this method, the dynamic inertia force is used to help further open the valve. In this system, latching need not occur, and not even necessarily contact need occur, between the actuator 20 and the magnet 22. This is a ballistic system, the actuator 20 being essentially thrown up by the inertia force into the field of influence of the magnetic field so that the magnetic field can contribute to the peak displacement of the actuator 20 from the seat 18. As in the first described method, the magnetic field must be designed to be less than the spring force at the maximum deflection point so that the valve will close when the piezo force is relieved. Also, in either method, mass could be added to the actuator 20 so as to increase the inertia force, if desired.

It should be noted that, to practice the invention, it is not necessary that the magnet 22 be an electromagnet. Instead, as stated above the magnet 22 could be a permanent magnet, or could utilize residual magnetism to establish the magnetic field which acts on the actuator 20. Also, once the desired spacing between the magnet 22 and actuator 20 has been determined by trial and error for a particular application, it may not be necessary to adjust the magnet position since the desired spacing can be controlled by dimensional tolerances.

The invention provides a piezo-electrically actuated fluid control valve in which the utilization of magnetic forces provides greater valve deflection for a given input voltage, or which can provide the same deflection for significantly less voltage. The result is improved valve performance, or lower power required to drive the valve, and also potentially lower cost of the electronic control circuits used to drive the actuator 20. In addition, the actuator is smaller and lighter than prior solenoid operated or piezo-operated actuators, and as a result has a fast frequency response, so that it may be used to control relatively high pressures over a relatively wider pressure control band and at a higher frequency for a lower pressure dither amplitude.

Embodiments of the invention have been described in considerable detail. Modifications and variations of the embodiments described will be apparent to persons skilled in the art. Therefore, the invention should not be limited to the embodiments described, but should be defined by the claims which follow.

We claim:

1. In a valve of the type having a piezo-electric actuator for varying a flow area past a valve seat, said actuator being of the type having a layer of piezoelectric material and an electrode sheet laminated to said piezo-electric layer, the improvement wherein;

said valve includes a magnet opposite from said seat with said actuator between said magnet and said seat; and said actuator includes a material which is magnetically attractable by said magnet.

2. The improvement of claim 1, wherein said magnet is an electro-magnet.

3. The improvement of claim 1, wherein said actuator is in the shape of a sheet having opposed planar surfaces, at least one of said surfaces facing and being generally parallel and adjacent to said seat and the other of said surfaces facing and being generally parallel and adjacent to a surface of said magnet.

4. The improvement of claim 3, wherein said actuator is mounted in said housing at opposite edges of said actuator so that said housing constrains said edges against movement in the direction between said magnet and said seat, said one surface of said actuator and said seat defining between them said flow area.

5. The improvement of claim 1, wherein said electrode sheet is made of a material which is magnetically attractable.

6. The improvement of claim 5, wherein said layer of piezo-electric material is on one side of said actuator and said electrode sheet is on an opposite side, and said one side faces said seat and said opposite side faces said magnet.

7. The improvement of claim 5, wherein said electrode sheet extends beyond said layer of piezo-electric material and defines opposite edges which are constrained by said housing against movement in the direction away from said seat.

8. The improvement of claim 1, wherein said actuator normally seats against said seat so that said valve is normally closed.

9. The improvement of claim 1, wherein said pressure exterior of said seat is normally higher than said pressure interior of said seat so that said exterior pressure normally biases said actuator toward said seat.

10. The improvement of claim 1, further comprising means for adjusting the position of said magnet relative to said actuator.

11. The improvement of claim 1, wherein the strength of a magnetic field produced by said magnet is adjustable.

12. The improvement of claim 1, further comprising means for applying a pulse width modulated control voltage to said actuator.

13. The improvement of claim 1, further comprising means for applying a proportional analog control voltage to said actuator.

14. The improvement of claim 1, wherein said magnet is an electromagnet which can be electrically energized in concert with said actuator.

15. The improvement of claim 14, further comprising a power source for energizing said actuator with a first pulse width modulated signal and a power source for energizing said electromagnet with a second pulse width modulated signal, wherein said second pulse width modulated signal goes low before said first pulse width modulated signal goes low.

16. The improvement of claim 15, wherein said second pulse width modulated signal reverses in polarity at or after the time said first signal goes low.

* * * * *